(12) United States Patent
Feiveson et al.

(10) Patent No.: US 8,972,955 B2
(45) Date of Patent: Mar. 3, 2015

(54) REDUCING NETWORK TRIPS FOR REMOTE EXPRESSION EVALUATION

(75) Inventors: Eric H. Feiveson, Seattle, WA (US); Jackson M. Davis, Bothell, WA (US); Gregg Bernard Miskelly, Seattle, WA (US)

(73) Assignee: Microsoft Technology Licensing LLC, Redmond, WA (US)

( * ) Notice: Subject to any disclaimer, the term of this patent is extended or adjusted under 35 U.S.C. 154(b) by 429 days.

(21) Appl. No.: 13/117,139

(22) Filed: May 27, 2011

(65) Prior Publication Data

US 2012/0304156 A1   Nov. 29, 2012

(51) Int. Cl.
*G06F 9/44* (2006.01)
*G06F 11/36* (2006.01)
*G06F 9/45* (2006.01)

(52) U.S. Cl.
CPC ............ *G06F 11/3648* (2013.01); *G06F 11/36* (2013.01); *G06F 8/427* (2013.01); *G06F 11/3636* (2013.01)
USPC ........................................................ 717/131

(58) Field of Classification Search
CPC ...................................................... G06F 11/36
USPC ........................................................ 717/131
See application file for complete search history.

(56) References Cited

U.S. PATENT DOCUMENTS 6,042,614 A * 3/2000 Davidson et al. ............. 717/116
7,636,913 B2  12/2009 Heydarian et al.
2010/0162049 A1 * 6/2010 Stall et al. ........................ 714/38

OTHER PUBLICATIONS

Stamos et al.;"Remote Evaluation"; Transactions on Programming Languages and Systems; Oct. 1990; pp. 537-565.*
"Java(tm) Platform Debugger Architecture"; available on washington.edu website; Aug. 25, 2009.*
"JVM(tm) Tool Interface Version 1.0"; Oracle.com website; Nov. 16, 2009.*
"Java Basic Operators"; Tutorials Point webite as captured by the Wayback MAchine Internet archive (archive.org) on Mar. 16, 2010.*
"Construction of Syntax Trees"; the Wayback Machine Internet archive (archive.org); May 6, 2010.*
"Q&A: How Do I use Stacks in Java?"; Javacoffeebreak.com website as captured by the Wayback MAchine Internet Archive (archive.org) on Feb. 16, 2010.*
"Turing Completeness"; Wikipedia website; May 26, 2010.*

(Continued)

*Primary Examiner* — Wei Zhen
*Assistant Examiner* — Clint A Thatcher
(74) *Attorney, Agent, or Firm* — Kevin Sullivan; Kate Drakos; Micky Minhas

(57) ABSTRACT

An expression can be evaluated in a remote debugging environment with one single round trip across the network. An expression evaluator on a local machine can compile the expression into a language-independent intermediate language (IL) that encodes all the information needed to evaluate the expression in the absence of a symbol table. The IL can include instructions that manipulate state inside the debuggee process, as well as logical operations needed to process the information. The IL language can be turing complete so that any computation needed to determine the state to read and write and how the information gathered is to be combined can be performed. The IL can be sent to the remote computer and can be interpreted on the remote computer. The IL can be interpreted on the remote computer using a stack based mechanism, without the need to access symbolic information on the local computer.

20 Claims, 5 Drawing Sheets

(56) References Cited

OTHER PUBLICATIONS

LocalVariable (Java Debug Interface), "com.sun.jdi: Interface LocalVariable"; May 2000.*
"Debugging programs with a external symbol file"; SIGQUIT blog at wordpess.com; Sep. 15, 2008.*
Cook, et al., "Language Design for Distributed Objects", Retrieved at << http://citeseerx.ist.psu.edu/viewdoc/download?doi=10.1.1.148.29&rep=rep1&type=pdf >>, Proceedings of the 1st International Workshop on Distributed Objects for the 21st Century, Jul. 6-10, 2009, pp. 4.
"Semi-implicit Batched Remote Code Execution as Staging", Retrieved at << http://okmij.org/ftp/meta-future/ >>, Retrieved Date: Mar. 29, 2011, pp. 10.
Ibrahim, et al., "Remote Batch Invocation for Compositional Object Services", Retrieved at << http://people.cs.vt.edu/tilevich/papers/batches.pdf >>, Proceedings of the 23rd European Conference on ECOOP—Object-Oriented Programming, 2009, pp. 24.
Stamos, et al., "Remote Evaluation", Retrieved at << http://www.comp.glam.ac.uk/blackboardAT/SY/SY3S06/CourseMaterial/PHIL Aug. 2007/week 7—Remote Evaluation/p537-stamos.pdf >>, ACM Transactions on Programming Languages and Systems, vol. 12, No. 4, Oct. 1990, pp. 537-565.
"How to implement remote debugging in Visual Studio 2005", Retrieved at << http://www.netomatix.com/articles/KBArticle.aspx?a=910448 >>, Sep. 28, 2006, pp. 14.
Pellegrino, Mike, "Improve Your Understanding of .NET Internals by Building a Debugger for Managed Code", Retrieved at <<http://msdn.microsoft.com/en-us/magazine/cc301510.aspx>>, Retrieved Date: Mar. 29, 2011, pp. 16.
"CLR Debugging Overview", Retrieved at << http://msdn.microsoft.com/en-us/library/bb397953.aspx >>, Retrieved Date : Mar. 29, 2011, pp. 9.
"Remote Data Access in MDSplus", Retrieved at << http://www.mdsplus.org/index.php?title=Documentation:Tutorial:RemoteAccess&open=645888248557080805361&page=Documentation%2FThe+MDSplus+tutorial%2FRemote+data+access+in+MDSplus >>, Retrieved Date : Mar. 29, 2011, pp. 5.

* cited by examiner

STEP 1 261
- 262 — READ REGISTER EBP
- 264 — PUSH CONSTANT4 //OFFSET TO "i"
- 266 — ADD

STEP 2 263 — 268 — READ 4 BYTES OF MEMORY

STEP 3 265
- 270 — PUSH CONSTANT 1
- 272 — ADD

STEP 4 267
- 274 — READ REGISTER EBP
- 276 — PUSH CONSTANT 8 //OFFSET TO "pSQUID"
- 278 — ADD

STEP 5 269 — 280 — READ 4 BYTES OF MEMORY

STEP 6 271
- 282 — PUSH CONSTANT 0x10012345 //ADDRESS OF CSQUID::SWIM
- 284 — CALL FUNCTION

STEP 7 273 — 286 — RETURN TOP OF STACK

260

REDUCING NETWORK TRIPS FOR REMOTE EXPRESSION EVALUATION

BACKGROUND

When debugging a process executing on a remote computer, typically information has to be passed back and forth several times between the two computers because neither computer has all the information it needs for the debug operation. Suppose for example, a client computer is debugging a process executing on a server computer. Suppose the user is stopped at a breakpoint and wants to evaluate an expression in the debuggee process. Several pieces of state in the remote process such as register values, or other information stored in memory, has to be obtained in order for an expression evaluator on the local machine to evaluate the expression. If each time a piece of state is read from the remote machine, a request is sent and the user has to wait for a response, the process of debugging can be very slow. For example, evaluation of the expression "a+b+c+d" would involve at a minimum 4 round trips across the network to complete.

Alternatively, the expression could be evaluated completely on the remote machine. This would entail having the expression evaluator, the language-specific components and all the symbolic information on the remote computer. This approach typically involves sending large files over the network. Moreover, it may not even be possible to copy all the language-specific components to the remote machine, because, for example, permissions are lacking, or because the language components are not compatible with the operating system or processor of the remote machine.

SUMMARY

An expression can be evaluated in a remote debugging environment with one single round trip across the network. Expressions can be evaluated in two stages. In the first stage, the expression evaluator can compile the expression into a language-independent intermediate language (IL) in which symbols or other concepts that cannot be resolved by the remote computer are removed. In the second stage, the IL can be sent to the remote computer and can be interpreted on the remote computer. The IL can encode all the information needed to evaluate the expression, including all the reads and writes regarding state inside the debuggee process, as well as logical operations needed to process the information. The IL language can be turing complete so that any computation needed to determine the state to read and write or to combine or process the data can be performed. The IL can be interpreted on the remote computer, without the need to access symbolic information on the local computer.

IL can be compiled and sent to the remote computer once, and can be evaluated one or more times without requiring repeated compilation and thus repeatedly receiving an IL stream from the debugger machine. The IL can be encoded as a sequence of bytes that are saved on the remote computer and decoded at interpretation. For example, debuggers can support conditional breakpoints, in which an expression is to be evaluated when a breakpoint is hit. A conditional breakpoint can stop the debuggee only when the expression evaluates to a specified value. That is, conditional breakpoints can be implemented by compiling the expression into IL and sending it to the remote computer when the breakpoint is set. Then, each time the breakpoint is encountered, the remote computer can interpret the IL. No information needs to be sent to the client and no round trips across the network are required unless the process is stopped.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
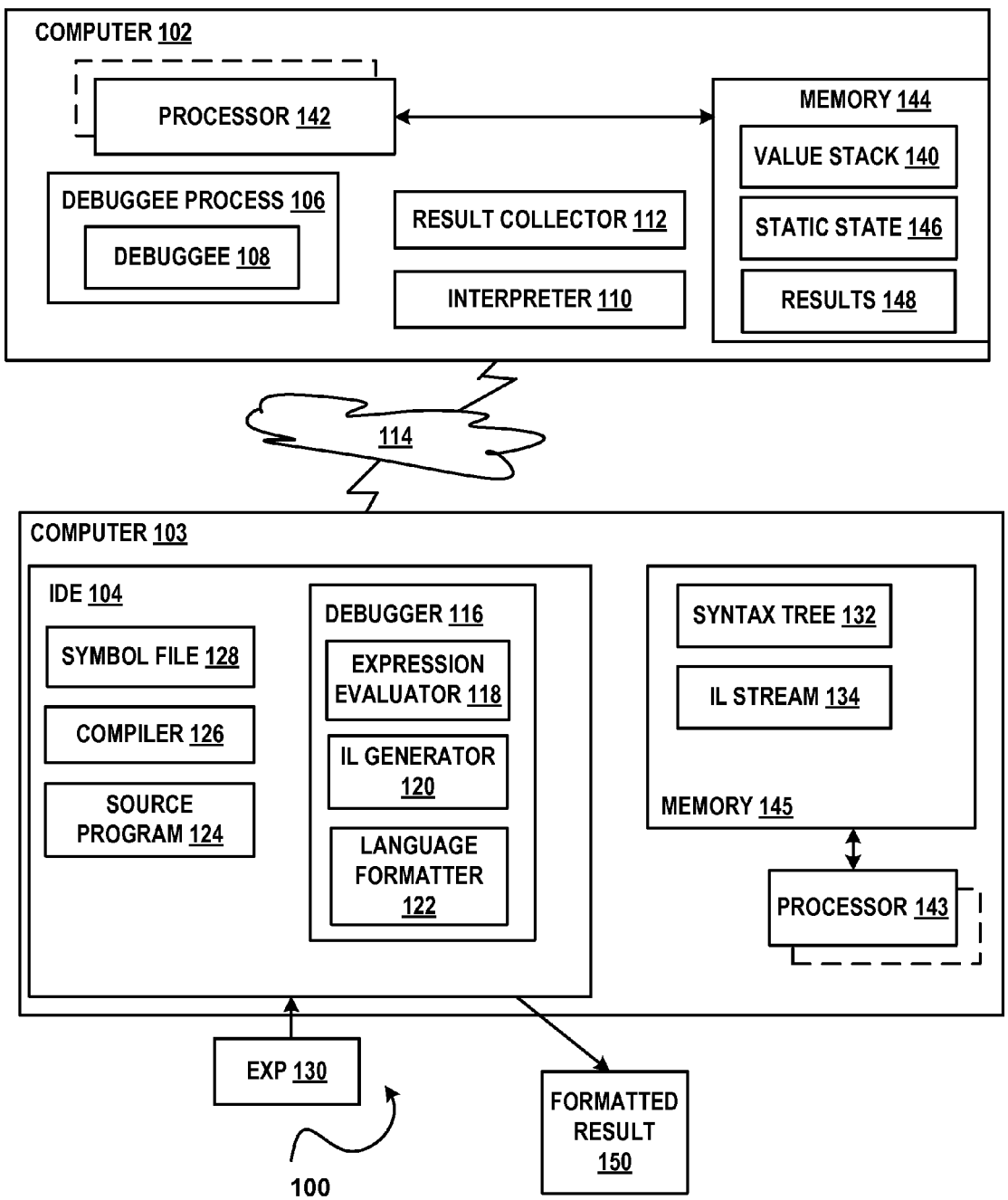
FIG. 1 illustrates an example of a system 100 that reduces network trips for remote expression evaluation in accordance with aspects of the subject matter disclosed herein.

Communication over a network can be an expensive operation. In accordance with aspects of the subject matter disclosed herein, network trips in a remote debugging environment can be reduced by sending an expression evaluated by an expression evaluator on a local debugger machine and compiled into a form that can be interpreted by the remote computer (e.g., into a form in which concepts such as symbols that the remote computer cannot resolve have been removed and replaced with a series of instructions that enable the remote computer to resolve the symbols). The expression can be compiled into an intermediate language (IL) and an IL stream or a data structure representative thereof can be sent to the remote debuggee machine. An abstract syntax tree created from the expression being evaluated can be used to generate the IL stream that is sent to the remote machine. The semantics of the IL into which the evaluated expression is compiled can comprise a turing complete linear sequence of instructions. The instructions can be interpreted on the remote machine. This can be implemented by maintaining a value stack on the remote machine where each item on the stack comprises a sequence of bytes of variable length. As each instruction in the IL is interpreted, any parameters needed by the instruction can be popped off the value stack, the operation can be performed, and the results of the operation (if applicable) can be pushed back onto the stack.

Alternatively, state can be maintained by an array of values. Instructions can take parameters that specify the indices of the location in the array from which the inputs are read and to which outputs are written. Alternatively, an instruction can read inputs from fixed locations and write outputs to fixed locations, assuming the availability of an instruction that copies values between locations. The result of an operation performed on one instruction (e.g., a first instruction) can be used to generate a result that is used as an input to another instruction (e.g., a second instruction). An intermediary result that is input to another instruction in the linear sequence of instructions can be generated. An operation performed on the second instruction can be used to generate a result that is used as an input to a third instruction and so on. Instructions that are batched together in a single transmission and sent across a network can include instructions that depend on results of other instructions sent in the single transmission. The final result, which can include a set of items, can be sent back to the local debugger computer. Thus, an expression evaluation can be performed using a single transmission from a first computer to a second computer and a single transmission response back from the second computer to the first computer (that is, a single round trip across the network).

The IL instruction set can be a turing complete set of operations that include primitives to read and write state in the debuggee. Primitives can include an operation that reads a register, writes a register, allowing the prior computation to determine a value to store in the register, read memory, allowing a prior computation to specify the address of the memory to read, write memory, allowing a prior computation to specify the address in memory to write and the data to be written, and add a previously computed value to the list of end results to be returned back to the requester.

Value stack manipulation operations can include an operation that pushes a constant sequence of bytes onto the stack, an operation that duplicates the top of the stack, an operation that pops the top item off the stack and discards it, an operation that pops the top item off the stack and saves it in an external storage location outside the stack, an operation that loads an item from an external storage location and pushes it onto the value stack. Control flow operations can include a conditional jump to another location in the IL stream, an unconditional jump to another location in the IL stream, and an operation that terminates the IL instruction stream, etc. In a stack-based implementation, the condition value can be popped off the value stack. Logical and arithmetic operations can include add, subtract, multiply and divide operations for integer or floating-point values. Other arithmetic operations can include a modulus operation, an equality comparison and an inequality comparison. Logical operations can include a bitwise "and" operation, a bitwise "or" operation, a bitwise "xor" operation, a bitwise "not" operation, a bit shift left or right, conversion operations between integer and floating-point types, or between combinations of integer types. In a stack-based implementation each logical/arithmetic operation can pop operands from the value stack, and then push the result of the logical/arithmetic operation back onto the value stack. The bits popped off the value stack can be integer or floating-point values.

Code can be implemented on the remote machine to interpret the IL. The code implemented on the remote machine can maintain the value stack in a stack-based implementation and can walk the list of instructions in the IL, performing the task indicated by each instruction. The compiled or interpreted IL can be evaluated repeatedly without re-compilation or re-interpretation.

Reducing Network Trips for Remote Expression Evaluation

FIG. 1 illustrates an example of a system 100 for reducing network trips for remote expression evaluation in accordance with aspects of the subject matter disclosed herein. All or portions of system 100 may reside on one or more computers such as the computers described below with respect to FIG. 3. System 100 or portions thereof may execute on a software development computer such as the software development computer described with respect to FIG. 4. System 100 or portions thereof may execute within an IDE such as IDE 104 or may execute in a standalone fashion, outside of an IDE. IDE 104 can be an IDE such as the one described with respect to FIG. 4 or can be any other IDE. All or portions of system 100 may be implemented as a plug-in or add-on.

System 100 may include one or more computing devices or computers such as a remote computer and a local computer. The remote computer can be a server computer and the local computer can be a client computer or vice versa. System 100 can include a computer such as computer 102 and/or another or second computer such as computer 103. Computer 102 can comprise one or more processors such as processor 142, etc., a memory such as memory 144, a program being debugged (e.g., debuggee 108) executing in a debuggee process 106. Computer 102 can also include an interpreter or interpreter module or modules such as interpreter 110. Computer 102 can also include a results collector such as result collector 112. Other components well known in the arts may also be included but are not here shown. It will be appreciated that one or more of the above can be loaded into memory 144 to cause one or more processors such as processor 142, etc. to perform the actions attributed to the one or more modules that contribute to the operation to reduce network trips when evaluating an expression in a remote debugging environment.

Computer 103 can comprise one or more processors such as processor 143, etc., a memory such as memory 145, and one or more modules that comprise a debugger such as debugger 116. Alternatively, the debugger may not exist in an IDE and can execute in a non-IDE environment. Debugger 116 can include an expression evaluator such as expression evaluator 118, an IL generator such as IL generator 120 and one or more language formatters such as language formatter 122. A language formatter may correspond to a language compiler (e.g., compiler 126). That is, for example, if the program being debugged (the debuggee) is written in the programming language C++, the language formatter 122 may format debug results into C++ statements. The language formatter 122 can format debug results in any programming language. Other components well known in the arts may also be included but are not here shown. It will be appreciated that one or more of the above can be loaded into memory 145 to cause one or more processors such as processor 143, etc. to perform the actions attributed to the one or more modules that contribute to the operation to reduce network trips when evaluating an expression in a remote debugging environment.

The computers of system 100 may communicate via a network 114. Network 114 can be any network, as described more fully below. On computer 103, a source program such as source program 124 can be compiled by a compiler such as compiler 126, generating a symbol file such as symbol file 128 and executable program code, not shown, (e.g., the program code executing in debuggee process 106 comprising debuggee 108 on computer 102). The symbol file 128 can include information such as but not limited to an offset for a memory address at which expression variables, functions, parameters, constants and so on are stored. FIG. 1 illustrates a remote debug session in which a user can be debugging the program, the source code of which is source program 124 on computer 103 and the executable of which is executing in debuggee process 106 executing on computer 102. Debug communications are sent and received between computers via network 114. In the course of debugging a program, a user can set breakpoints in the source code. When the breakpoint is executed, the program execution can be stopped and the user may be given the opportunity to perform debugging operations including but not limited to expression evaluation.

When a remote debug session is initiated on a computer, static state (e.g., static state 146) associated with the debuggee process can be sent to the debugger computer (e.g., in FIG. 1 computer 103). In the course of debugging a program, a user can input or otherwise provide an expression such as expression 130 to debugger 116. In accordance with aspects of the subject matter disclosed herein, the expression evaluator 118 may receive expression 130, symbol file 128 and static state such as static state 146 from debuggee process 106 and can generate therefrom an abstract syntax tree such as abstract syntax tree 132. Static state information can include information including but not limited to a location in memory at which an executable or module has been loaded and so on. The IL generator 120 can receive the abstract syntax tree 132 and generate an IL stream such as IL stream 134 from the abstract syntax tree 132. The IL stream 134 can comprise a linear sequence of instructions that are batched together into a single transmission and sent to a computer on which the debuggee 108 is running. The IL can define a series of operations to be performed on computer 102 that evaluate the expression in the absence of a symbol file on computer 102. IL stream 134 can be sent to interpreter 110 executing on computer 102. The interpreter 110 can receive the IL stream 134 and execute the instructions comprising the IL stream 134, as described more fully below. The results of executing the instructions can be collected by a result collector 112 and the result 148 can be sent back to computer 103. Result 148 can be received by a language formatter such as language formatter 122 and displayed on a display screen, printed by a printer or otherwise presented as formatted result 150. Result 148 can be an ordered list of items whose return to the debugger machine is triggered by a final return instruction coded into the IL stream 134.

It will be appreciated that IL generator can be incorporated into the expression evaluator or debugger or can be a standalone, plug-in or add-in module or modules. Similarly, the language formatter can be incorporated into the debugger or can be a standalone, plug-in or add-in module or modules. It will be appreciated that the language formatter can be a language formatter for the programming language in which the source program was compiled.

In operation, in response to user input initiating a debug session provided to computer 103, a debug session can be initiated on a program (e.g., debuggee 108) executing on a remote computer (e.g., computer 102). When the remote debug session is initiated, static state 146 can be received from computer 102 by computer 103. At some point in the debugging process a request for an evaluation of an expression (e.g., expression 130) can be received by debugger 116. For example the source expression:

pSquid->Swim(1+i);

can be received.

Figures 2A, 2B:
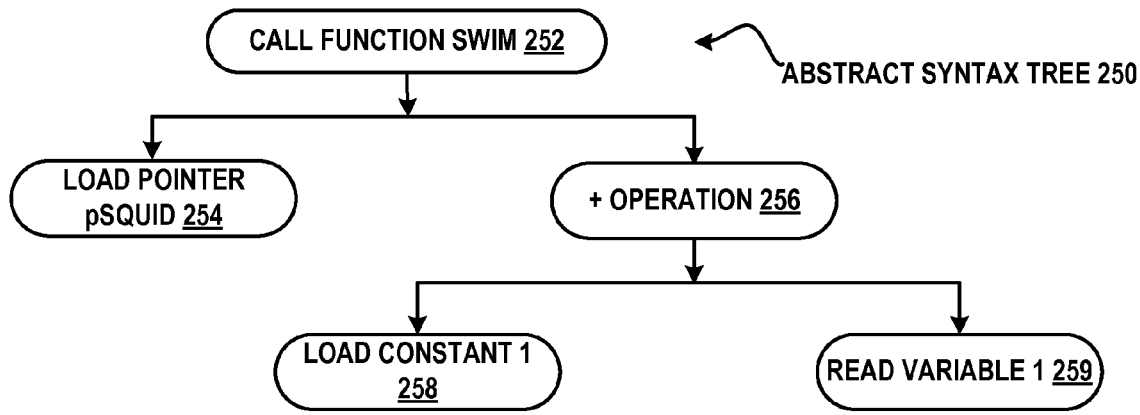
FIG. 2a is an illustration of an example of a syntax tree 250 as is known in the art.
FIG. 2b is an illustration of an intermediate language (IL) stream in accordance with aspects of the subject matter disclosed herein.

An expression evaluator 118 of debugger 116 can receive the expression 130, a symbol file 128, some or all of the static state associated with the debuggee process 106 and can generate therefrom an abstract syntax tree 132. That is, the expression 130 can be the expression "pSquid->Swim((1+i);" which can be parsed into an abstract syntax tree such as the abstract syntax tree 250 illustrated in FIG. 2a. For example, the abstract syntax tree 250 illustrated in FIG. 2a can be compiled into IL such as the IL 260 illustrated in FIG. 2b. The abstract syntax tree 250 indicates that a function such as the function Swim 252 has been called, that the first parameter to the function Swim 252 is a parameter that is a pointer to pSquid 254, and that the second parameter is a plus operation 256. The operands to the plus operation 256 can follow (e.g., constant 1 258 and read variable 1 259). The abstract syntax tree can be walked and can be compiled into IL by the IL generator 120. For example, the IL generator 120 can receive the abstract syntax tree 250 and generate therefrom an IL stream such as the IL stream 260 illustrated in FIG. 2b. Step 1 261 can obtain the memory address of "i" (read value of ebp, add 4), instructions 262, 264 and 266. Step 2 263 can read the memory at the address from step 1 261 to get the value of "i" (instruction 268). Step 3 265 can add 1 to the value of "i" obtained from step 2 263 (instructions 270 and 272). Step 4 267 can obtain the memory address of pSquid (read value of ebp, add 8), instructions 274, 276 and 278. Step 5 269 can read memory at the address from step 4 267 to get the value of pSquid (instruction 280). Step 6 271 can invoke the function CSquid::Swim, passing in the result of step 5 269 as the "this" parameter and the result of step 3 265 as an argument (instructions 282 and 284) and step 7 273 can append the result of step 6 271 (the return value of the function) to the list of final results to be returned back to the caller (instruction 286). The IL stream generated by the IL generator 120 can be sent to another computer (e.g., computer 102), comprising the remote computer.

The semantics of the IL into which the evaluated expression is compiled on computer 103 can comprise a turing complete linear sequence of instructions. The instructions can be interpreted on computer 102. Computer 102 can maintain a value stack such as value stack 140 in memory 144 on computer 102. Each item on the value stack 140 can comprise a sequence of bytes of variable length. As each instruction in the IL is interpreted, any parameters generated by instructions in the IL can be pushed onto the value stack 140 and any parameters needed by the next instruction can be popped off the value stack 140. The operation can be performed, and the results of the operation (if applicable) can be pushed back onto the value stack 140.

The IL instruction set can be a turing complete set of operations that include primitives to read and write state in the debuggee. Primitives can include an operation that reads a register from the debuggee, and pushes the result onto the value stack, an operation that writes a register to the debuggee, popping the bytes to write off the value stack. Further primitives can include an operation that reads memory from the debuggee, popping the address to read from off the value stack, and pushing the result onto the value stack and an operation that writes memory to the debuggee, popping the address and bytes to write off the value stack, and pushing the result back onto the value stack. Further primitives can include an operation that can pop the top item off the value stack and add this value to a collection of results to be returned to the debugger. The final result of the IL execution operation can be an ordered list of items returned to the local debugger machine through a return instruction.

Value stack manipulation operations can include an operation that pushes a constant sequence of bytes onto the stack, an operation that duplicates the top of the stack, an operation that pops the top item off the stack and discards it, an operation that pops the top item off the stack and saves it in an external storage location outside the stack, an operation that loads an item from an external storage location and pushes it onto the value stack, control flow operations, a conditional jump to another location in the IL stream, where the condition value is popped off the value stack, an unconditional jump to another location in the IL stream, an operation that terminates the IL instruction stream, and logical/arithmetic operations. Each logical/arithmetic operation can pop operands from the value stack, and then push the result of the logical/arithmetic operation back onto the value stack. Arithmetic operations can include add, subtract, multiply and divide. The bits popped off the value stack can be integer or floating-point values. Other arithmetic operations can include a modulus operation, an equality comparison and an inequality comparison. Logical operations can include a bitwise "and" operation, a bitwise "or" operation, a bitwise "xor" operation, a bitwise "not" operation, a bit shift left or right, conversion operations between integer and floating-point types, or between combinations of integer types.

Code can be implemented on the remote machine to interpret the IL. The code implemented on the remote machine can maintain the value stack and walk the list of instructions in the IL, and performing the task indicated by each instruction. A result collector 112 can collect the result 148 and send result 148 to computer 103. Thus, it will be apparent that an expression has been evaluated and a result returned in a single round trip across the network.

Figure 2C:
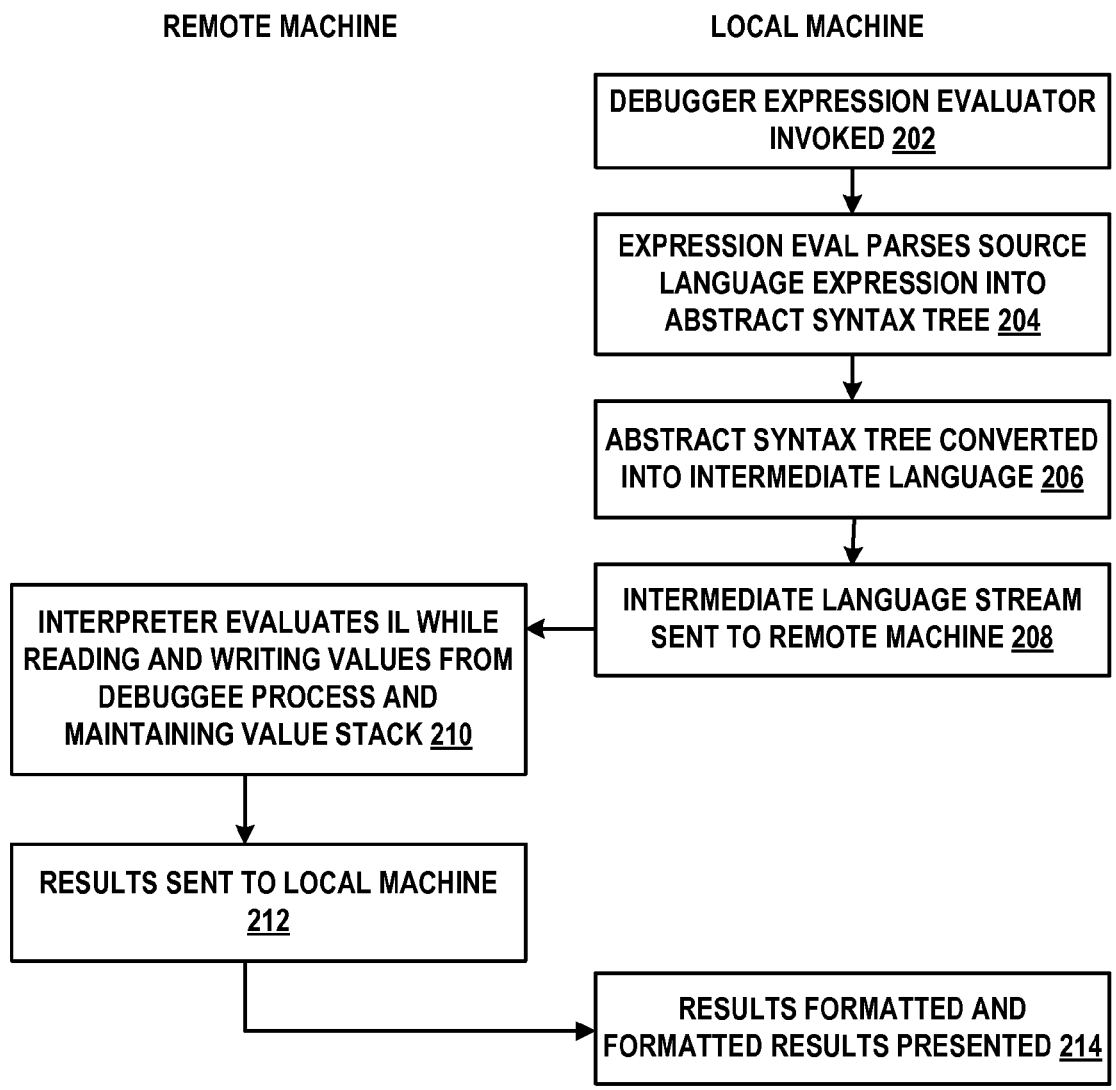
FIG. 2c is a flow diagram of an example of a method 200 for reducing network trips for remote expression evaluation in accordance with aspects of the subject matter disclosed herein.

FIG. 2c illustrates an example of a method 200 for reducing network trips for remote expression evaluation in accordance with aspects of the subject matter disclosed herein. The method described in FIG. 2c can be practiced by a system such as but not limited to the one described with respect to FIG. 1. Some of the actions described below can be optional. Some of the actions described below can be executed in a sequence that differs from that described below. At 202 a debugger expression evaluator can be invoked on a local machine for a program being debugged on a remote machine. At 204 an expression evaluator can parse the expression into an abstract syntax tree. At 206 the abstract syntax tree can be converted into intermediate language on the local machine. The intermediate language may comprise a linear sequence of instructions that encodes all the information needed to evaluate an expression in a single round trip across the network. The linear sequence of instructions can define operations to manipulate the state of a debuggee process executing on the second computer. The linear sequence of instructions can include logical operations performed on the state of the debuggee process that are needed to evaluation the expression on the remote computer without accessing the debugger machine. Alternatively, instead of generating a linear sequence of instructions, the intermediate language may be represented by a data structure that can be processed by the remote machine. At 208 the intermediate language stream or data structure can be sent to the remote machine in a single transmission. At 210 the remote machine can receive the intermediate language stream and can interpret the IL stream or data structure representing the IL, reading and writing values from the debuggee process and maintaining the value stack. A result of executing a first instruction can comprise an input to a second instruction and so on. At 212 the results of 210 can be collected and sent to the local machine. At 214 the local machine can receive the results, format the results and display the formatted results on a display screen, route the formatted results to a printer or otherwise present the formatted results.

Example of a Suitable Computing Environment

Figure 3:
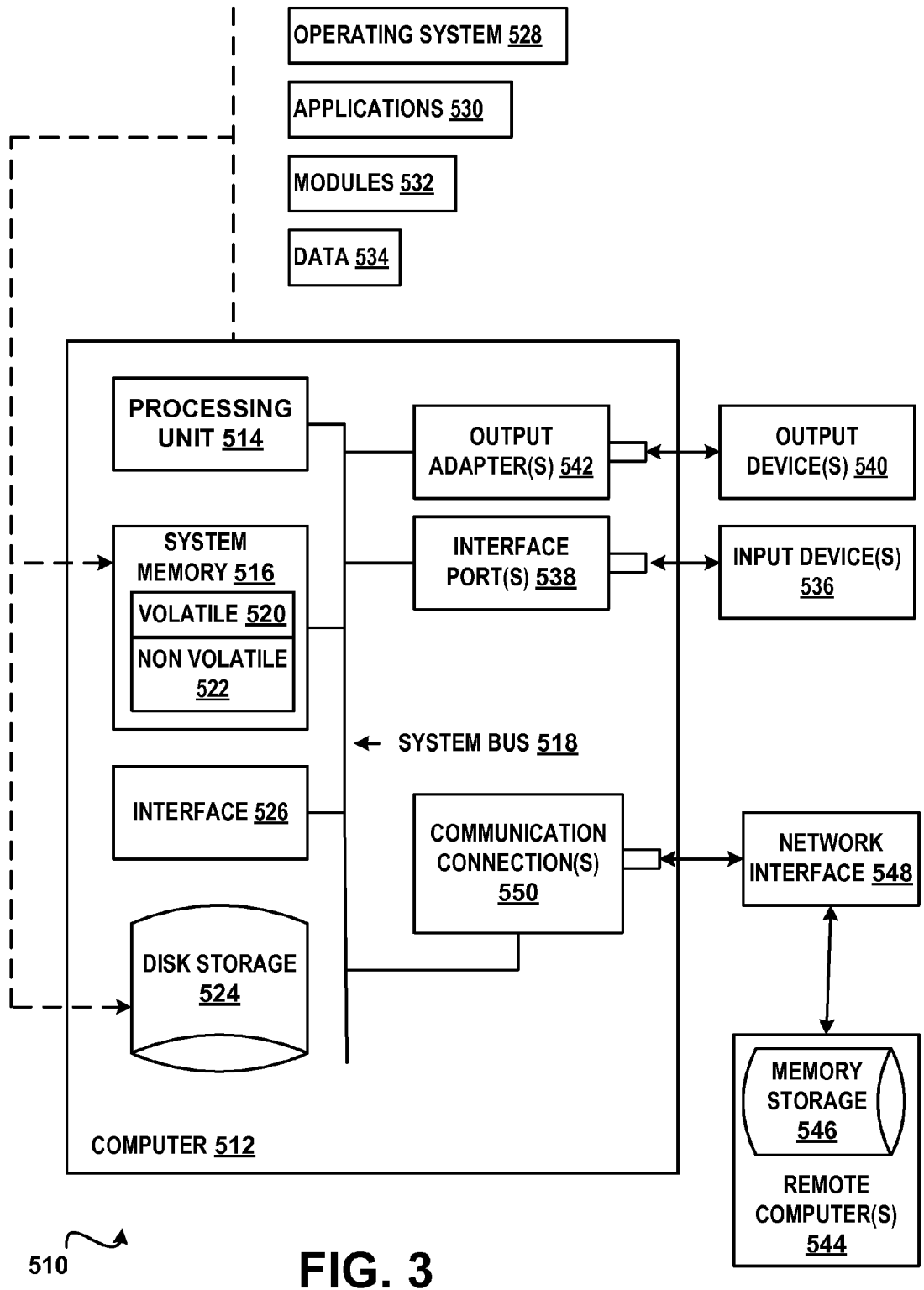
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other transitory or non-transitory medium which can be used to store the desired information and which can be accessed by computer 512.

It will be appreciated that FIG. 3 describes software that can act as an intermediary between users and computer resources. This software may include an operating system 528 which can be stored on disk storage 524, and which can allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
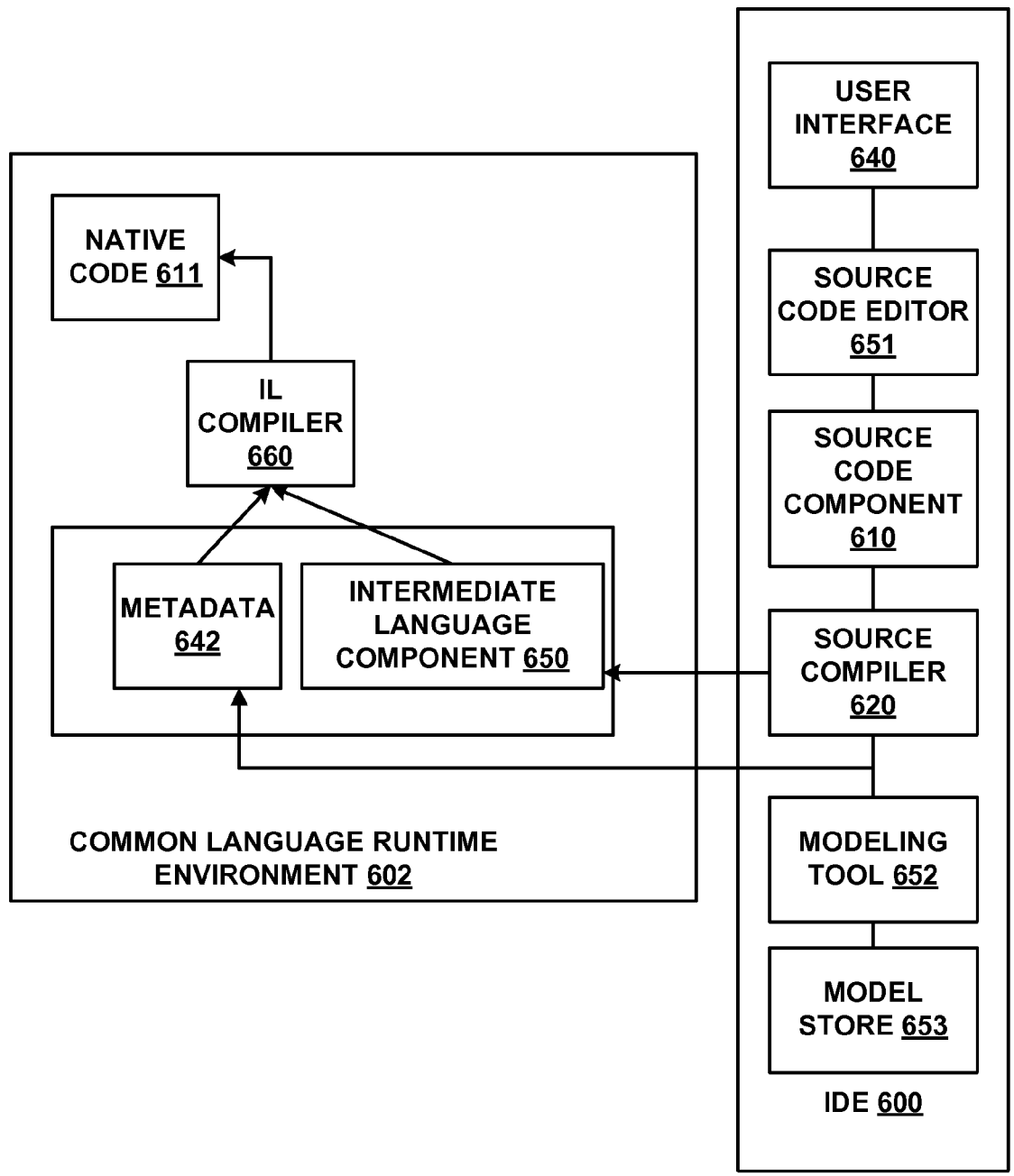
FIG. 4 is a block diagram of an example of an integrated development environment in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine executable instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
a processor and a memory of a first computing device; and
at least one module configured to cause the processor of the first computing device to evaluate an expression in a single round trip across a network in a remote debugging environment in a second computing device, the remote debugging environment executing a source program compiled by the first computing device without access to symbolic information generated from the compilation and which is stored in the first computing device, by:
generating a syntax tree representing the expression based on the symbolic information;
converting the syntax tree into an intermediate language, the intermediate language comprising instructions that contain all information needed to execute the expression on the second computing device without access to the symbolic information;
sending the intermediate language in a single transmission to a second computing device over the network;

receiving results of executing the intermediate language on the first computing device;

formatting the results on the first computing device; and presenting the results on the first computing device.

2. The system of claim 1, wherein the results are formatted in a programming language in which a debuggee program being debugged in the remote debugging environment is written.

3. The system of claim 1, wherein the intermediate language comprises a turing complete language.

4. The system of claim 2, wherein the programming language is C++.

5. The system of claim 1, wherein the intermediate language comprises a set of operations including primitives to read and write state in a debuggee process executing on the second computing device.

6. The system of claim 5, wherein the primitives comprise an operation that reads a register from the debuggee process and pushes a result of reading the register onto a value stack, an operation that writes a register to the debuggee process, popping bytes to write from the value stack, an operation that reads memory from the debuggee process, popping an address to read from the value stack and pushing a contents of the address onto the value stack and an operation that writes memory associated with the debuggee process, popping an address and a number of bytes to write from the value stack, and pushing a result back onto the value stack, an operation that pops a top item off the value stack and adds the top item to a collection of results returned to the first computing device.

7. The system of claim 1, wherein the intermediate language comprises arithmetic operations comprising add, subtract, multiply and divide integer or floating-point values, a modulus operation, an equality comparison, an inequality comparison, logical operations comprising a bitwise "and" operation, a bitwise "or" operation, a bitwise "xor" operation, a bitwise "not" operation, a bit shift left or right, conversion operations between integer and floating-point types, or conversion operations between combinations of integer types.

8. A method comprising:

receiving over a network in a single transmission from a first computer by a processor of a second computer, an intermediate language comprising instructions that encode all information needed to execute an expression in absence of symbolic information from the first computer in a single round trip across the network, the instructions defining manipulation of state of a debuggee process executing on the second computer and logical operations performed on the state of the debuggee process needed to evaluate the expression, wherein the symbolic information is generated from a compilation of a source program on the first computer and not used in executing the instructions, wherein the expression is associated with the compiled source program;

executing the instructions comprising at least a first instruction and a second instruction, a result of executing the first instruction comprising an input to the second execution;

determining a result of executing the instructions; and sending the result to the first computer.

9. The method of claim 8, wherein intermediary results and the result of executing the instructions are maintained on a value stack associated with the debuggee process.

10. The method of claim 8, wherein the instructions can be evaluated a plurality of times on the second computer while receiving the instructions from the first computer only once.

11. The method of claim 8, wherein an intermediate language instruction set comprises a turing complete set of operations.

12. The method of claim 9, wherein operations manipulating the value stack comprise an operation that pushes a constant sequence of bytes onto the value stack, an operation that duplicates a top item of the value stack, an operation that pops the top item off the value stack and discards the top item, an operation that pops the top item off the value stack and saves the top item in a storage location external to the value stack, an operation that loads an item from an external storage location and pushes the loaded item onto the value stack, control flow operations, a conditional jump to another location in the linear sequence of instructions, where a condition value for the conditional jump is popped off the value stack, an unconditional jump to another location in the linear sequence of instructions, an operation that returns a result comprising an expression evaluation to the first computer, logical operations or arithmetic operations.

13. The method of claim 8, wherein the expression comprises a conditional breakpoint.

14. The method of claim 13, wherein the second computer interprets the instructions for the conditional breakpoint a plurality of times and does not stop execution in response to determining that a condition of the conditional breakpoint has not been encountered.

15. A computer-readable storage medium, not comprising a signal per se, comprising computer-executable instructions which when executed cause at least one processor of a computing device to:

receive over a network in a single transmission from a first computer comprising a debugger by the at least one processor of the computing device executing a debuggee process, a stream of intermediate language comprising a linear sequence of instructions, wherein the linear sequence of instructions encodes information needed to execute an expression in absence of symbolic information in a single round trip across the network, the linear sequence of instructions manipulating state of the debuggee process and defining operations to evaluate the expression, wherein the symbolic information is generated from a compilation of a source program and not used in execution of the linear sequence of instructions, the compiled source program executing in the debuggee process, the expression associated with the compiled source program;

execute the linear sequence of instructions comprising at least a first instruction and a second instruction, wherein an intermediary result resulting from executing the first instruction is provided to the second instruction;

determine a result of executing the linear sequence of instructions; and send the result to the first computer in a single transmission.

16. The computer-readable storage medium of claim 15, comprising further computer-executable instructions, which when executed cause the at least one processor to:

maintain intermediary and final results of executing the linear sequence of instructions on a value stack associated with the debuggee process.

17. The computer-readable storage medium of claim 16, comprising further computer-executable instructions, which when executed cause the at least one processor to:

execute a linear sequence of instructions of an intermediate language instruction set comprising a turing complete set of operations comprising value stack manipulation operations comprising: an operation that pushes a constant sequence of bytes onto the value stack, an operation that duplicates a top item of the value stack, an operation that pops the top item off the value stack and discards the top item, an operation that pops the top item off the value stack and saves the top item in a storage location external to the value stack, an operation that loads an item from an external storage location and pushes the loaded item onto the value stack, control flow operations, a conditional jump to another location in the linear sequence of instructions, where a condition value is popped off the value stack, an unconditional jump to another location in the linear sequence of instructions, an operation that returns a result comprising an expression evaluation to the first computer, logical operations or arithmetic operations.

18. The computer-readable storage medium of claim 15, comprising further computer-executable instructions, which when executed cause the at least one processor to:

receive a particular linear sequence of instructions once;

evaluate the particular linear sequence of instructions a plurality of times; and send a result of the evaluation to the first computer once.

19. The computer-readable storage medium of claim 15, comprising further computer-executable instructions, which when executed cause at least one processor to:

receive a linear sequence of instructions for a conditional breakpoint.

20. The computer-readable storage medium of claim 16, comprising further computer-executable instructions, which when executed cause at least one processor to:

continue execution in response to determining that the condition specified in the conditional breakpoint expression is not encountered.

* * * * *